2,921,047
Patented Jan. 12, 1960

2,921,047

STABILIZED POLY(ETHYLENE OXIDE) COMPOSITION

Keith L. Smith, Charleston, W. Va., assignor to Union Carbide Corporation, a corporation of New York No Drawing. Application June 20, 1956
Serial No. 592,513

1 Claim. (Cl. 260—45.9)

The present invention relates to stabilizers for use with ethylene oxide polymers. More particularly this invention is concerned with stabilized compositions of ethylene oxide polymers, in which degradation in molecular weight and viscosity loss is substantially prevented. The invention further relates to the method of making these compositions.

Ethylene oxide polymers having a reduced viscosity of at least 1.0 can be prepared by a variety of processes employing a number of different catalysts, such as, for example, the alkaline earth metal derivatives of organic hydroxyl compounds (i.e. strontium methylate, calcium derivative of ethylene glycol); certain pure metal carbonates which preferably contain about 0.1 percent sorbed water by weight of the carbonate (i.e. strontium and zinc carbonate); and the hexammoniates and amides of the group II metals.

For example, fifteen hundredths of a gram of zinc amide polymerized thirty grams of ethylene oxide in a sealed tube at 90° C. In twenty-four hours a quantitative yield of polymer of reduced viscosity 3.6 was obtained. Room temperature polymerization of ethylene oxide with 0.1 percent calcium amide catalyst gave a twenty percent conversion to polymer of reduced viscosity 61 in five days.

The polymers are also useful as thickeners and binders, as well as plasticizers in adhesive compositions. The polymers with viscosities greater than 30 are particularly useful as thickeners, small concentrations giving viscous solutions. The polymers are also useful for the production of films and various molded articles.

These polymers, regardless of the process or catalyst employed in preparation, are susceptible to degradation in molecular weight. Such degradation increases with the molecular weight of the polymer, the length of aging, and increasing temperatures.

Thus the usefulness of ethylene oxide polymers in many of their applications is greatly enhanced by obtaining and maintaining a relatively high molecular weight therein (i.e., a reduced viscosity of 1.0 or higher).

The loss in molecular weight of poly(ethylene oxide) which is not protected against degradation can, under many use conditions, be so serious as to change the physical character of the material from a tough strong resin to a much less useful brittle wax. Further, stabilization of poly(ethylene oxide) becomes progressively more difficult with the higher molecular weight grades of resin. Prior known methods and materials for stabilizing ethylene oxide polymers of reduced viscosities substantially below one are, almost without exception, ineffective when used with a higher molecular weight grade.

The problem is further made difficult by the variety of exposures to which the poly(ethylene oxide) resin may be put under practical operating conditions. These conditions will require, for example, that relatively dilute solutions of resin in water maintain their viscosity over relatively long periods of time, that solution and resin hot-melt retain their molecular weight upon exposure to high temperature, and that the resin be substantially free from degradation when subjected to thermoplastic processing operations. The problem is further complicated by the possibility that the degradation of poly(ethylene oxide) may be caused by any one or a combination of several means, among them being the hydrolysis and oxidation of segments of the polymer chain.

Buffering of poly(ethylene oxide) solutions to maintain a low hydrogen ion concentration lessens degradation of the resin. While this may be useful under certain circumstances, in many applications a high pH is undesirable, and adequate buffering action to maintain a rather high pH will, in many instances, involve high concentrations of salt, which in itself will prove inexpedient. Further, difficulty will often occur in stabilizing dry resin by this process.

According to the present invention it has been found that small amounts of phenyl beta-naphthylamine, polymerized trimethyldihydroxyquinoline or N-nitrosodiphenylamine incorporated into ethylene oxide polymer and solutions or suspensions thereof, wherein the polymer has a reduced viscosity of at least 1.0, provides a composition that is stabilized against substantial degradation which otherwise would result in exposure of the poly(ethylene oxide) to moisture, heat, relatively high hydrogen ion concentrations, oxygen and various combinations of these factors.

Poly(ethylene oxide) resin containing phenyl beta-naphthylamine, polymerized trimethyldihydroxyquinoline or N-nitrosodiphenylamine as a stabilizer therefor further provides stabilization of the resin without substantial alteration in its physical properties and will neither be easily extracted from the resin into which it has been incorporated nor will it contribute to the opacity of the latter.

It has been found that there is an optimum range of concentration of the materials of this invention, when incorporated into poly(ethylene oxide). An amount of stabilizer which is at least 0.3 part to 0.6 part per 100 parts of poly(ethylene oxide) by weight thereof, is preferred. Below 0.3 part the stabilization is not as effective and above 0.6 part no concomitant advantage is obtained with the increased concentration although larger amounts can be used.

The ethylene oxide polymers preferably have a reduced viscosity of 1.0 or higher and a melting point of 65±2° C. i.e. no strength temperature, as determined by stiffness-temperature measurements.

These measurements were arrived at in the following manner: The force required to stretch a 0.250" x 2.0" sample of poly(ethylene oxide), one percent (0.02") was measured over a temperature range from —60° C. to +20° C. in 10° C. increments and from 20° C. to 65° C. in 5° C. increments. This polymer showed an abrupt drop off in stiffness between 60° C. and 65° C. —7200 p.s.i. to 400 p.s.i. in this range.

As the term is used throughout this specification, "reduced viscosity" of a polymer is regarded as a measure of its molecular weight. The reduced viscosity of a solution of a polymer at a given temperature is obtained by dividing the specific viscosity by the concentration of the polymer in the solution measured in grams of polymer per hundred milliliters of the solvent. The specific viscosity is obtained by dividing the difference between the viscosity of the solution and the viscosity of the pure solvent by the viscosity of the solvent. The reduced viscosities of the ethylene oxide polymers referred to herein were measured at 30° C. in acetonitrile at a concentration of 0.2 gram per hundred milliliters of solvent.

The method by which these stabilizers are incorporated into the ethylene oxide resins is not critical, and any of a variety of means of insuring thorough incorporation may be used. One of the most efficient of these involves admixture of the stabilizer with the resin at the time the latter is formed. Another method advantageously employed comprises introducing the stabilizer into a resin suspension, and bringing the stabilizer into intimate contact with the dispersed polymer by evaporating off the diluent. Suitable non-solvent diluents are, for example, saturated aliphatic ethers, ketones, saturated aliphatic hydrocarbons, higher molecular weight saturated alcohols and saturated aliphatic esters (i.e. dibutyl ether, diethyl ether, dioxane, acetone, methyl ethyl ketone, hexane, cyclohexane, heptane, butanol, ethyl acetate). Other methods include mixing the stabilizer with the molten resin; dissolving the stabilizer in resin solutions employing solvent diluents therefor, for example, methanol, acetic acid, benzene and water (e.g. dilute aqueous solutions) preferably 5 percent solution in dimethyl formamide or acetonitrile; or incorporation on a two-roll mill, extruder, Banbury mixer, or similar device. The stabilizer is effective in diluents regardless of the concentration of polymer.

Phenylbeta-naphthylamine, polymerized trimethyldihydroxyquinoline and N-nitrosodiphenylamine may not, however, be incorporated into the polymerizing mixture used for manufacturing poly(ethylene oxide) until polymerization is substantially complete, since these stabilizers either inhibit polymerization or are themselves rendered ineffective as stabilizers by the polymerization process.

The following examples are illustrative of the invention.

EXAMPLE 1

Samples of unstabilized poly(ethylene oxide) resin were dissolved in acetonitrile, together with the stabilizer to be tested, as listed in Table I. The amount of stabilizer added, based on the weight of poly(ethylene oxide) resin in the acetonitrile solution, is as shown in Table I. When the resin and stabilizer were dissolved the solution was placed in a vacuum desiccator and evaporated to dryness under high vacuum. The dry resin was then cut into many small pieces, and two random samples taken from the resin for testing purposes. One sample was dissolved in water to form a 0.2 percent solution, and the reduced viscosity determined. This is reported in Table I as initial reduced viscosity (water). The other random sample of dry resin was aged in a forced-circulation oven for 20 minutes at 150° C.±4° C. This sample was then removed from the oven and dissolved in water to make a 0.2 percent aqueous solution as in the case of the initial determination. The percent loss in reduced viscosity on aging was then calculated as that percent of the initial reduced viscosity which was lost as the result of the aging treatment. Results as shown in Table I.

Table I.—*Stabilizing effect of different materials when incorporated into poly(ethylene oxide) resin subjected to dry heat exposure*

| Stabilizer Used | Concentration of Stabilizer in Resin | Initial Reduced Viscosity (Water) | Reduced Viscosity after aging 20 minutes at 150° C. | Percent loss in Reduced Viscosity |
| --- | --- | --- | --- | --- |
| None | 0.0 | 9.35 | 1.80 | 80.8 |
| 4-tertiary Butyl-2-phenyl-phenol | 0.5 | 8.55 | 1.30 | 84.8 |
| ortho-alpha Phenylphenol | 0.5 | 8.80 | 1.25 | 85.8 |
| para alpha Cumylphenol | 0.5 | 7.85 | 1.40 | 82.2 |
| 4 (alpha-Methylbenzyl)-2-Phenylphenol | 0.5 | 8.05 | 1.25 | 84.5 |
| Phenyl beta-naphthylamine | 0.5 | 9.10 | 6.20 | 31.86 |
| Trimethyl dihydroxyquinoline Polymer | 0.5 | 10.15 | 2.55 | 74.9 |
| N-nitrosodiphenylamine | 0.5 | 9.70 | 3.10 | 68.0 |

EXAMPLE 2

Resins containing different potential stabilizers for poly(ethylene oxide) resin were prepared in a manner similar to that of Example 1 above. After the resin was dried in the vacuum desiccator, it was cut up as before and a portion of it dissolved in water to form a 0.2 percent aqueous solution. The initial reduced viscosity of this solution was determined. Then the solution was placed in a 150 milliliter Erlenmeyer glass-stoppered flask and the air space above the solution in the bottle purged with oxygen. The bottles were then placed in a forced convection oven and aged for one week at 70° C.±3° C. At the end of this time the reduced viscosity of the 0.2 percent aqueous solution was again determined. The percent loss in reduced viscosity was calculated as in Example 1 and is reported in Table II.

Table II.—*Stabilizing effect of different materials when incorporated into poly(ethylene oxide) resin subjected to heat exposure in 0.2 percent water solution*

| Stabilizer Used | Initial Reduced Viscosity (Water) | Reduced Viscosity after ageing 7 days at 70° C. | Percent Loss in Reduced Viscosity |
| --- | --- | --- | --- |
| None | 6.70 | 0.04 | 99.4 |
| para-Hydroxydiphenylamine | 8.22 | 2.40 | 70.8 |
| N,N'-di-beta-Naphthyl-para phenylenediamine | 9.63 | 0.19 | 98.0 |
| 2,6-Ditertiary Butyl para cresol | 8.49 | 2.82 | 66.8 |
| Phenyl alpha-Naphthalymine | 8.55 | 0.10 | 98.8 |
| Trimethyldihydroxyquinoline Polymer | 8.68 | 6.91 | 20.4 |
| N-nitrosodiphenylamine | 9.12 | 5.53 | 39.4 |
| Phenyl beta-Naphthylamine | 8.15 | 4.45 | 45.4 |

I claim:

A composition comprising poly(ethylene oxide) which has a reduced viscosity value in the range of from about 1.0 to 60 as measured at a concentration of 0.2 gram of said poly(ethylene oxide) in 100 milliliters of acetonitrile at 30° C., and a stabilizing amount of N-nitrosodiphenylamine.

References Cited in the file of this patent

UNITED STATES PATENTS

| 2,481,278 | Ballard et al. | Sept. 6, 1949 |
| 2,706,189 | Pruitt et al. | Apr. 12, 1955 |